(12) United States Patent
Kashima et al.

(10) Patent No.: US 9,214,697 B2
(45) Date of Patent: Dec. 15, 2015

(54) LITHIUM SECONDARY BATTERY

(75) Inventors: Mari Kashima, Kyoto (JP); Eriko Ishiko, Kyoto (JP); Tetsuya Higashizaki, Kyoto (JP)

(73) Assignee: Dai-Ichi Kogyo Seiyaku Co., Ltd., Kyoto (JP)

( * ) Notice: Subject to any disclaimer, the term of this patent is extended or adjusted under 35 U.S.C. 154(b) by 533 days.

(21) Appl. No.: 12/668,093

(22) PCT Filed: Jul. 8, 2008

(86) PCT No.: PCT/JP2008/062331
§ 371 (c)(1),
(2), (4) Date: Jan. 14, 2010

(87) PCT Pub. No.: WO2009/011249
PCT Pub. Date: Jan. 22, 2009

(65) Prior Publication Data
US 2010/0159334 A1 Jun. 24, 2010

(30) Foreign Application Priority Data
Jul. 18, 2007 (JP) .................................. 2007-187194

(51) Int. Cl.
*H01M 2/16* (2006.01)
*H01M 10/052* (2010.01)
*H01M 10/0569* (2010.01)
*H01M 10/0525* (2010.01)
*H01M 10/42* (2006.01)

(52) U.S. Cl.
CPC ............ *H01M 10/052* (2013.01); *H01M 2/162* (2013.01); *H01M 2/1686* (2013.01); *H01M 10/0569* (2013.01); *H01M 10/4235* (2013.01); *H01M 10/0525* (2013.01); *H01M 2300/0045* (2013.01); *Y02E 60/122* (2013.01); *Y02T 10/7011* (2013.01)

(58) Field of Classification Search
CPC . H01M 2/162; H01M 2/1686; H01M 10/052; H01M 10/04235; H01M 10/0569; H01M 10/0525; H01M 2300/0045
See application file for complete search history.

(56) References Cited

U.S. PATENT DOCUMENTS

| | | | |
|---|---|---|---|
| 5,932,373 A * | 8/1999 | Nagamine et al. | 429/218.1 |
| 6,365,301 B1 | 4/2002 | Michot et al. | |
| 2004/0131934 A1 | 7/2004 | Sugnaux et al. | |
| 2005/0277026 A1 * | 12/2005 | Nishikawa et al. | 429/249 |
| 2006/0024569 A1 | 2/2006 | Hennige et al. | |
| 2006/0088767 A1 | 4/2006 | Li et al. | |
| 2006/0210873 A1 * | 9/2006 | Hollenkamp et al. | 429/200 |
| 2006/0216607 A1 * | 9/2006 | Takeuchi et al. | 429/232 |
| 2006/0281006 A1 * | 12/2006 | Fujino et al. | 429/246 |
| 2007/0202406 A1 * | 8/2007 | Takahashi et al. | 429/231.3 |
| 2007/0212615 A1 | 9/2007 | Jost et al. | |
| 2008/0138700 A1 | 6/2008 | Horpel et al. | |
| 2013/0314094 A1 * | 11/2013 | Farmer et al. | 324/430 |

FOREIGN PATENT DOCUMENTS

| | | |
|---|---|---|
| JP | 2004-533702 | 11/2004 |
| JP | 2005-104845 | 4/2005 |
| JP | 2005-536857 | 12/2005 |
| JP | 2007-311151 | 11/2007 |
| JP | 2008-130229 | 6/2008 |
| WO | WO-2005/104269 | 11/2005 |
| WO | WO-2005/104288 | 11/2005 |

OTHER PUBLICATIONS

Dictionary.com definition for "coated": http://dictionary.reference.com/browse/coated?s=t; Jun. 11, 2014.*

* cited by examiner

*Primary Examiner* — Eugenia Wang
(74) *Attorney, Agent, or Firm* — Jordan and Hamburg LLP

(57) ABSTRACT

An incombustible lithium secondary battery, which has excellent battery capacity and high safety, contains a separator provided between a positive electrode and a negative electrode, and a nonaqueous electrolytic solution containing a lithium salt, in which the nonaqueous electrolytic solution employs an ionic liquid as a solvent, and the separator contains an electrically insulating porous inorganic membrane and a substrate. The ionic liquid may contain a bis(fluorosulfonyl)imide anion as an anionic component, and may contain a cation containing a nitrogen atom as a cationic component.

2 Claims, No Drawings

LITHIUM SECONDARY BATTERY

BACKGROUND OF THE INVENTION

The present invention relates to a lithium secondary battery using an ionic liquid as a nonaqueous electrolytic solution, and more particularly relates to a lithium secondary battery using a separator constituted by an electrically insulating porous inorganic membrane and a substrate.

A lithium secondary battery is a small-sized and lightweight chargeable battery having a large storage capacity per unit volume or unit weight, and thus is widely used for a mobile phone, a notebook computer, a personal digital assistant (PDA), a video camcorder, a digital still camera and the like, thereby becoming essential for a small-sized and lightweight portable device that consumes relatively large electric power.

In recent years, a middle-sized or large-sized lithium battery for an electric bicycle and an electric vehicle is being developed, and the development thereof is expected as a measure for reducing the environmental load.

As a nonaqueous solvent used in a nonaqueous electrolytic solution for a lithium secondary battery, a polar non-protonic organic solvent is used since it easily dissolves a lithium salt and is hard to suffer electrolysis, but the solvent has a considerably low flashing point and thus involves a severe problem in safety, such as ignition and explosion due to heat upon overcharge or short circuit. In particular, there is an increasing demand of development of a lithium secondary battery with large capacity and high output power associated with reduction in size and weight of an electric device and development of an electric vehicle, the problem in safety is becoming an important problem to be solved.

Under the circumstances, the use of an ionic liquid, which is an incombustible compound, as a nonaqueous electrolytic solution of a lithium secondary battery is variously studied. As the use of an ionic liquid as a nonaqueous electrolyte, for example, the use of an ionic liquid, which contains a bis(fluorosulfonyl) imide anion as an anionic component, as a solvent is disclosed (Patent Document 1).

As a separator, a separator for a lithium high energy battery containing a flat flexible substrate having a large number of openings and a porous inorganic membrane is disclosed (Patent Document 2).

Patent Document 1: U.S. Pat. No. 6,365,301
Patent Document 2: JP-T-2005-536857

SUMMARY OF THE INVENTION

However, the lithium secondary battery disclosed in Patent Document 1 has a narrow usable voltage range of from 2.8 to 2.0 V and thus fails to provide sufficient battery capability. It is the current situation that the lithium battery using the ionic liquid disclosed in Patent Document 2 has an electrolytic solution having a high viscosity as compared to a battery using an organic solvent, and thus the constitutional materials of the battery, such as the separator, is lowly impregnated with the solution, whereby the battery has a large charge migration resistance and thus is inferior in battery capability in the electrolytic solution system in both output power and service life.

Accordingly, there is an increasing demand in a lithium secondary battery using an incombustible ionic liquid for enhancement of the capability of the battery by development of a novel battery constitutional material and study of an additive.

In view of the aforementioned problems, an object of the invention is to provide an incombustible lithium secondary battery that has excellent battery capability and high safety as compared to a conventional battery through selection and investigation of the battery constitutional materials for enhancement of safety, which is strongly demanded in a lithium secondary battery.

As a result of earnest investigations made by the inventors for solving the problems, it has been found that in the case where an ionic liquid containing a bis(fluorosulfonyl) imide anion as an anionic component is used as a solvent for dissolving a lithium salt as a supporting electrolyte in a lithium ion-conductive nonaqueous electrolytic solution, and a separator containing a porous flat flexible substrate and an electrically insulating inorganic membrane is combined therewith, the liquid impregnating property of the ionic liquid to the separator is improved.

It has been also found associated thereto that the internal resistance of the battery is largely decreased, and the lithium ion secondary battery using the ion liquid as an electrolyte is improved in output power characteristics and cycle characteristics. Furthermore, a battery using an incombustible ionic liquid is imparted with further safety by the shutdown mechanism of the aforementioned separator, whereby the battery can be drastically improved in safety.

Accordingly, the invention relates to a lithium secondary battery containing a separator provided between a positive electrode and a negative electrode, and a nonaqueous electrolytic solution containing a lithium salt, characterized in that the nonaqueous electrolytic solution uses an ionic liquid as a solvent, and the separator contains an electrically insulating porous inorganic membrane and a substrate.

It is preferred in the lithium secondary battery of the invention that the substrate is comprised of polymer fibers.

In the lithium secondary battery, the ionic liquid may contain a bis(fluorosulfonyl)imide anion as an anionic component.

In the lithium secondary battery, the ionic liquid may contain a cation containing a nitrogen atom as a cationic component.

It is preferred in the aforementioned embodiment that the cation containing a nitrogen atom in the ionic liquid is one or a mixture of two or more selected from alkylammonium, imidazolium, pyrrolidinium and piperidinium.

Against the problems of a battery including short circuit, ignition and explosion caused by severe use environments or increase of the internal temperature due to accidents of the battery, the invention provides measures for safety through two measures including the incombustible ionic liquid and the separator having a shutdown function, and can provide high safety as compared to a conventional electrolytic solution lithium battery.

A conventional polymer separator has a shutdown temperature around 120° C., and the fine pore structure of the separator is disrupted at the temperature to close all the fine pores, whereby transportation of electric current in the battery is blocked to enhance the safety. However, the separator is melted and shrunk under a higher temperature environment at from 150 to 200° C., the electrodes are in direct contact with each other at many spots inside the battery to form internal short circuit with a large area. The phenomenon brings uncontrollable reaction that explodes the battery.

On the other hand, the separator used in the invention is constituted by a substrate and an inorganic membrane component, and since the inorganic membrane component does not suffer meltdown, internal short circuit with a large area due to heat shrinkage does not occur even under a high temperature environment. The ceramic separator maintains the insulating function thereof even in the case of external combustion where the cell is overheated to more than 200° C.

Accordingly, the invention using an incombustible ionic liquid as an electrolyte in addition to the separator having a shutdown function at a high temperature provides safety that is clearly higher than the conventional system using a combination of a polymer separator and an organic electrolytic solution.

Another important advantage of the invention in addition to the improvement in safety resides in the favorable wettability of the separator. Accordingly, in the case where an ionic liquid having higher viscosity than an organic electrolytic solution is used as an electrolyte, the separator has excellent wettability as compared to a conventional separator, and the impregnation property of the ionic liquid to the surface and the interior of the separator can be largely improved. According thereto, the charge migration resistance upon using the ionic liquid as an electrolyte can be largely decreased, thereby improving the battery in output power characteristics and cycle characteristics.

DETAILED DESCRIPTION OF THE INVENTION

Embodiments of the invention will be described below.

The lithium secondary battery according to the invention is constituted by a separator that is provided between a positive electrode and a negative electrode and isolates them from each other, and a nonaqueous electrolytic solution for conducting lithium ion, containing a solvent having a lithium salt as a supporting electrolyte dissolved therein.

The active substance of the positive electrode is not particularly limited as far as it can perform occlusion and release of lithium ion. Examples of the positive electrode active substance include a metallic oxide, such as $CuO$, $Cu_2O$, $MnO_2$, $MoO_3$, $V_2O_5$, $CrO_3$, $Fe_2O_3$, $Ni_2O_3$ and $CoO_3$, a composite oxide of lithium and a transition metal, such as $Li_xCoO_2$, $Li_xNiO_2$ and $Li_xMn_2O_4$, a metallic chalcogen compound, such as $TiS_2$, $MoS_2$ and $NbSe_3$, and a conductive polymer compound, such as polyacene, poly-p-phenylene, polypyrrole and polyaniline.

In the invention, a composite oxide of at least one selected from transition metals including cobalt, nickel, manganese and the like with lithium, which is generally referred to as a high voltage system, is preferred since the releasing property of lithium ion and a high voltage can be obtained. Specific examples of the composite oxide of cobalt, nickel and manganese with lithium include $LiCoO_2$, $LiMnO_2$, $LiMn_2O_4$, $LiNiO_2$, $LiNi_xCO_{(1-x)}O_2$ and $LiMn_aNi_bCO_c$ (wherein a+b+c=

Materials obtained by doping the lithium composite oxides with a small amount of an element, such as fluorine, boron, aluminum, chromium, zirconium molybdenum and iron, may be used.

Material obtained by surface treating the surface of particles of the lithium composite oxides with carbon, MgO, $Al_2O_3$, $SiO_2$ or the like may be used.

Preferred examples of the active substance of the positive electrode in the invention also include, in addition to the aforementioned lithium-transition metal oxide, iron lithium phosphate represented by $Li_xFePO_4$ (wherein x is in a range of 0<x≤1.2, and is generally 1).

Iron lithium phosphate has a flat lithium occlusion-release potential around from 3.1 to 3.5 V/Li, and the entire oxygen atoms are bonded to phosphorus through covalent bonds to form polyanion, whereby oxygen in the positive electrode is not released upon increase of temperature to prevent the electrolytic solution from combusting. Consequently, iron lithium phosphate is superior to $LiCoO_2$ and the like in safety at a high temperature charge state. Furthermore, it has excellent characteristics in chemical and mechanical stability and thus is excellent in long-term storage stability.

The positive electrode active substances may be used in combination of two or more kinds of them.

An active substance capable of performing occlusion and release of lithium ion is used as an active substance of the negative electrode. As the active substance, the aforementioned metallic compounds and conductive polymer compounds used in the positive electrode may be used. Examples thereof include metallic lithium, a lithium alloy, such as LiAl, an antimony lithium occluding alloy, such as SbSn, InSb, $CoSb_3$ and $Mi_2MnSb$, a tin lithium occluding alloy, such as $Sn_2M$ (wherein M is Fe, Co, Mn, V or Ti), $V_2Sn_3$, $Sn/Cu_6Sn_6$ and $Sn/Ag_3Sn$, a silicon lithium occluding alloy, such as a Si—C composite series, a Si—Ti composite series and a Si-M thin membrane, a nano-composite material, an amorphous alloy material, a plating alloy, a Si amorphous thin membrane, a carbon material, such as amorphous carbon, mesocarbon microbeads (MCMB), graphite and natural graphite, a surface-modified product of the carbon material, tin oxide, and a Si negative electrode, such as $SiO_2$, and activated carbon, carbon fibers, carbon black and the like may be used in combination as a carbon material.

Non-graphitizable carbon (hard carbon (HC)) can be used as the active substance of the negative electrode. HC is not particularly limited as far as it is a carbon material that is obtained by carbonization through baking and is hardly graphitizable through a heat treatment at a high temperature like vitreous carbon, and in general, such a carbon material is used that does not form graphite even through carbonization or graphitization. HC may be used solely or in combination of two or more kinds of them, and may be used in combination with the aforementioned lithium alloy or carbon material.

Examples of the raw material for forming non-graphitizable carbon include a conjugated resin, such as a furfuryl alcohol resin, a furfural resin, a phenol resin, a furan resin, a halogenated vinyl resin, an acrylic resin, a polyimide resin, a polyamide resin, PFA resinous coal, PAN carbon fibers and vitreous carbon, but are not limited thereto. Cellulose and a derivative thereof, and an organic polymer compound are also used as a raw material for non-graphitizable carbon, and hard carbon can be formed by baking a natural material, such as sugar, coffee beans and rice bran.

Non-graphitizable carbon shows a large capacity of $LiC6$ or larger, and furthermore shows a small variation of plane-plane distance $d_{002}$ associated with charge and discharge reaction, whereby the crystallite undergoes small distortion upon charge and discharge reaction, thereby providing smaller volume expansion than a graphitic material.

A material having a redox potential that is as close as possible to that of metallic lithium is selected for the negative electrode active substance, thereby attaining the high potential and the high energy density in the invention. For attaining the constitution, the combination with the positive electrode is important.

A conductive agent is used in the positive electrode and the negative electrode. An electronic conductive material that does not adversely affect the battery capability can be used as the conductive agent. In general, carbon black, such as acetylene black and Ketjen black, is used, and such conductive materials may be used as natural graphite (e.g., squamous graphite, scaly graphite and earthy graphite), artificial graphite, carbon whiskers, carbon fibers, metallic powder (e.g., copper, nickel, aluminum, silver and gold), metallic fibers and a conductive ceramic material. These may be contained as a mixture of two or more kinds of them. The addition amount thereof is preferably from 1 to 30% by weight, and particularly preferably from 2 to 20% by weight, based on the mass of the active substance.

As a collector for the electrode active substance, any electronic conductive material that exhibits no adverse influence in the battery thus fabricated can be used. Examples of the collector for the positive electrode include aluminum, titanium, stainless steel, nickel, sintered carbon, a conductive polymer and conductive glass, and a member containing aluminum, copper or the like having a surface treated with carbon, nickel, titanium, silver or the like can be used for improving adhesion property, electric conductivity, oxidation resistance and the like.

Examples of the collector for the negative electrode include copper, stainless steel, nickel, aluminum, titanium, sintered carbon, a conductive polymer, conductive glass and an Al—Cd alloy, and a member containing copper or the like having a surface treated with carbon, nickel, titanium, silver or the like can be used for improving adhesion property, electric conductivity, oxidation resistance and the like.

The surface of the material for the collector may be subjected to an oxidation treatment. Examples of the shape thereof include a foil form, and also include a film form, a sheet form, a net form, a punched or expanded member, a lath member, and a molded member, such as a porous member and a foamed member. The thickness thereof is not particularly limited, and may be from 1 to 100 μm.

Examples of a binder for binding the active substance to the positive electrode or the negative electrode include a fluorine resin, such as polyvinylidene fluoride (PVDF), a PVDF copolymer, such as a copolymer of PVDF with hexafluoropropylene (HFP), perfluoromethyl vinyl ether (PFMV) or tetrafluoroethylene (TFE), polytetrafluoroethylene (PTFE) and fluorine rubber, and such a polymer as styrene-butadiene rubber (SBR), ethylene-propylene rubber (EPDM) and a styrene-acrylonitrile copolymer, and a polysaccharide, such as carboxylmethyl cellulose (CMC), and a thermoplastic resin, such as a polyimide resin, may be used in combination, but are not limited thereto. These may be used as a mixture of two or more of them. The addition amount thereof is preferably from 0.5 to 30% by weight, and particularly preferably from 1 to 10% by weight, based on the mass of the active substance.

As the separator, a porous membrane is generally used, and such a separator is used in the invention that is constituted by an electrically insulating porous inorganic membrane and a substrate.

The substrate is formed of woven or nonwoven polymer fibers or natural fibers. The woven polymer fibers are not particularly limited. Examples of the nonwoven polymer fibers or natural fibers include a nonwoven fabric, fleece and felt. Among these, a nonwoven fabric is preferred from the standpoint of liquid impregnating property of the electrolyte.

The nonwoven fabric of polymer fibers that can be used as the substrate is formed of polyolefin fibers, such as polyethylene and polypropylene, polyester fibers, such as polyethylene terephthalate (PET), aramid fibers, polyacrylonitrile fibers, vinylon fibers, rayon fibers, glass fibers or the like or formed of mixed fibers thereof.

The nonwoven fabric is obtained, for example, from long filaments or short filaments formed of polymer fibers having a diameter of from 0.1 to 10 μm, and preferably from 1 to 4 μm, by such a production method as a spunbond method, a thermal bond method, a neadlepunch method, a stitchbond method and a chemical bond method.

The thickness of the substrate is not particularly limited, and is advantageously preferably less than 50 μm, more preferably less than 40 μm, and particularly from 10 to 40 μm. The thickness of the substrate considerably influences the characteristics of the separator since the flexibility thereof and the area resistance of the separator impregnated with the electrolytic solution depend on the thickness of the substrate. Furthermore, a thinner separator enhances the packing density in a battery stack, and thus a larger amount of energy can be stored per unit volume. Moreover, the surface areas of the electrodes and the surface area of the separator are increased, thereby increasing the limited electric current density per unit total weight.

The separator preferably has a weight as low as possible for utilizing advantageously in a high energy battery. Accordingly, the substrate preferably has a weight of less than 30 g/m$^2$, more preferably less than 25 g/m$^2$, and particularly from 5 to 25 g/m$^2$.

The separator of the invention has the aforementioned substrate having coated thereon a porous and electrically insulating inorganic membrane. Examples of the inorganic membrane include a metallic oxide of an element selected from Al, Zr, Si, Ti and Y, but are not limited thereto. According to the constitution, the separator has nonconductivity. Specific examples thereof include $Al_2O_3$, $SiO_2$ and $ZrO_2$, and a mixture thereof may also be used.

The inorganic component of the separator of the invention is preferably coated on 50% or more of the substrate, and particularly preferably coated on 60% or more thereof. The porosity of the inorganic component is preferably from 30 to 80%, and more preferably from 50 to 70%. The porosity can be measured by a known mercury porosimetry.

The membrane of a metallic oxide is applied on the substrate by coating a suspension liquid containing the metallic oxide thereon, and heating at least once to a temperature where the suspension liquid is fixed. The method is known as described in WO99/15252, and a porous nonconductive separator can be obtained by applying the suspension liquid onto the substrate by printing, compressing, pressing, roller coating, blade coating, brush coating, dip coating, spray coating or flow casting, thereby improving the liquid impregnation property of the ionic liquid to the separator.

In the lithium secondary battery of the invention, a nonaqueous electrolytic solution containing an incombustible ionic liquid and a lithium salt is used as a lithium ion conductive electrolyte.

An ionic liquid containing bis(fluorosulfonyl)imide anion (FSI anion) represented by the following formula (I) as an anionic component is used as a solvent for the nonaqueous electrolytic solution.

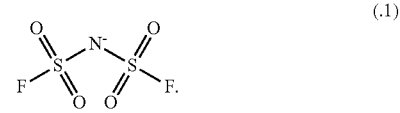

The preparation method of the FSI anion is not particularly limited, and a known method, such as reaction of fluorosulfonic acid and urea, may be used. The FSI compound obtained by the method generally has a low purity, and is used after appropriate purification with water, an organic solvent or the like for providing a favorable ionic liquid having an impurity content of 10 ppm or less. The impurities can be confirmed by analysis with a plasma emission spectrometric apparatus (inductively coupled plasma ICP).

The anionic component contained in the ionic liquid may contain, in addition to the FSI anion, such an anion as $BF_4^-$, $PF_6^-$, $SbF_6^-$, $NO_3^-$, $CF_3SO_3^-$, $(CF_3SO_2)_2N^-$ (which is referred to as TFSI), $(C_2F_5SO_2)_2N^-$, $(CF_3SO_2)_3C^-$, $CF_3CO_2^-$, $C_3F_7CO_2^-$, $CH_3CO_2^-$ and $(CN)_2N^-$. The anions may be used as a combination of two or more kinds of them.

In the ionic liquid used in the lithium secondary battery of the invention, the cationic structure combined with the FSI anion is not particularly limited, and a combination with a cation that forms an ionic liquid having a melting point of 50° C. or less is preferred. When the melting point exceeds 50° C., it is not preferred since the viscosity of the nonaqueous electrolytic solution is increased, whereby a problem occurs in the cycle characteristics of the lithium secondary battery, and the discharge capacity tends to be decreased.

Examples of the cation include a compound that contains in the structure thereof one of or two or more of elements selected from N, P, S, O, C and Si and has in the skeleton thereof a liner structure or a cyclic structure, such as a 5-membered ring and a 6-membered ring.

Examples of the cyclic structure, such as a 5-membered ring and a 6-membered ring, include a heteromonocyclic compound, such as furan, thiophene, pyrrole, pyridine, oxazole, isoxazole, thiazole, isothiazole, furazane, imidazole, pyrazole, pyrazine, pyrimidine, pyridazine, pyrrolidine and piperidine, and a condensed heterocyclic compound, such as benzofuran, isobenzofuran, indole, isoindole, indolizine and carbazole.

Among these cations, a linear or cyclic compound containing a nitrogen element is particularly preferred since it is industrially inexpensive and is chemically and electrochemically stable.

Preferred examples of the cation containing a nitrogen element include an alkylammonium, such as triethylammonium, an imidazolium, such as ethylmethylimidazolium and butylmethylimidazolium, a pyrrolidinium, such as 1-methyl-1-propylpyrrolidinium, and a piperidinium, such as methylpropylpiperidinium.

In the invention, the lithium salt, which is dissolved in the ionic liquid as a supporting electrolyte of the nonaqueous electrolytic solution, is not particularly limited as far as it is a lithium salt that is ordinarily used as an electrolyte of a nonaqueous electrolytic solution.

Examples of the lithium salt include $LiPF_6$, $LiBF_4$, $LiClO_4$, $LiAsF_6$, LiCl, LiBr, $LiCF_3SO_3$, LiI, $LiAlClO_4$, $LiC(CF_3SO_2)_3$, $LiN(C_2F_5SO_2)_2$, $LiBC_4O_8$, LiFSI and LiTFSI. The lithium salts may be used as a mixture of two or more of them. Among these, LiFSI and LiTFSI are preferred.

The lithium salt is contained in the ionic liquid in a concentration of generally from 0.1 to 2.0 mol/L, and preferably from 0.3 to 1.0 mol/L.

A halogen ion contained as an impurity in the nonaqueous electrolytic solution used in the lithium secondary battery of the invention is preferably 10 ppm or less. Other impurities, which include an alkali metal ion and an alkaline earth metal ion, are preferably 10 ppm or less in terms of total amount. When the impurities are contained in a large amount, the cycle characteristics of the lithium secondary battery are adversely influenced, which results in reduction in service life as a secondary battery.

The lithium secondary battery of the invention may be in an arbitrary form, such as a cylindrical form, a coin form, a rectangular form and the like, and the same basic structure of the battery may be applied to any form and can be practiced with modification in design depending on purposes.

The lithium secondary battery of the invention in a cylindrical for, for example, obtained in such a manner that a negative electrode containing a negative electrode collector having coated thereon a negative electrode active substance and a positive electrode containing a positive electrode collector having coated thereon a positive electrode active substance are wound with a separator intervening between them to form a wound assembly, which is housed in a battery canister, and a nonaqueous electrolytic solution is charged therein, followed by sealing the canister with insulating plates disposed at the top and the bottom thereof.

In the case where the invention is applied to a coin form lithium secondary battery, an assembly containing a negative electrode in a disk form, a separator, a positive electrode in a disk form and a stainless steel plate accumulated on each other is housed in a coin form battery canister, to which a nonaqueous electrolytic solution is charged, followed by sealing the canister.

EXAMPLE

The invention will be described in more detail with reference to examples below, but the invention is not limited thereto.

Lithium secondary batteries were produced for Examples and Comparative Examples. A positive electrode and a negative electrode were prepared according to the following manner, and the lithium secondary batteries shown in Table 1 were produced. The material used are as follows.

Material Used
 Negative electrode active substance: (non-graphitizable carbon)HC, "Carbotron PS(F)", available from Kureha Corporation
 Negative electrode active substance: MCMB, "MCMB 25-28", available from Osaka Gas Chemicals Co., Ltd.
 Negative electrode active substance: graphite, "OMAC-1.5", available from Osaka Gas Chemicals Co., Ltd.
 Conductive agent: acetylene black, "Denka Black", available from Denki Kagaku Kogyo Co., Ltd.
 Binder: PVDF, "KF Binder", available from Kureha Corporation
 Dispersion medium: N-methyl-2-pyrrolidone (NMP), produced by Kishida Chemical Co., Ltd.
Separator
 Separion S240P30, produced by Degussa Japan Co., Ltd.
 Separion S240P25, produced by Degussa Japan Co., Ltd.
 Separion S450P35, produced by Degussa Japan Co., Ltd.
 Polyolefin microporous membrane: "Celgard", produced by Celgard K.K.

Example 1

Production of Positive Electrode 100 g of $LiMn_{1/3}Ni_{1/3}Co_{1/3}O_2$ as a positive electrode active substance, 5 g of acetylene black as a conductive agent, 6 g of PVDF as a binder, and 75 g of N-methyl-2-pyrrolidone (NMP) as a dispersion medium were mixed in a planetary mixer to prepare a positive electrode coating composition having solid content (components other than NMP) of 60%. The coating composition was coated on an aluminum foil having a thickness of 20 μm with a coating machine, and after drying at 130° C., subjected to a roll press treatment to provide a positive electrode having a coated weight of the positive electrode active substance of 4 mg/cm².

Production of Negative Electrode 100 g of HC (non-graphitizable carbon) as a negative electrode active substance, 10 g of acetylene black as a conductive agent, 5 g of PVDF as a binder, and 100 g of NMP as a dispersion medium were mixed in a planetary mixer to prepare a negative electrode coating composition having a solid content of 53.6%. The coating composition was coated on an electrolytic copper foil having a thickness of 10 μm, and after drying at 130° C., subjected to a roll press treatment to provide a negative electrode having a coated weight of the negative electrode active substance of 3 mg/cm$^2$.

Production of Lithium Secondary Battery

A laminated body having such a structure that Separion S240P30 as a separator was held between the positive electrode and the negative electrode thus obtained was produced, to which tab leads for providing terminals were welded, and the laminated body was then housed in a folded aluminum laminated package to produce a lithium secondary battery having a positive electrode area of 9 cm$^2$ and a negative electrode area of 10.2 cm$^2$. A solution obtained by dissolving LiTFSI in a salt concentration of 0.8 mol/kg in an ethylmethylimidazolium-FSI solvent was charged therein, and the aluminum laminated sheet at the opening was then sealed with a heat-sealer to produce a test cell.

Example 2

Production of Positive Electrode

A positive electrode having a coated weight of the positive electrode active substance of 5 mg/cm$^2$ was produced according to the manner in Example 1 except that the positive electrode active substance was 100 g of LiMn$_2$O$_4$/LiMn$_{1/3}$Ni$_{1/3}$CO$_{1/3}$O$_2$=50/50.

Production of Negative Electrode

A negative electrode having a coated weight of the negative electrode active substance of 5 mg/cm$^2$ was produced according to the manner in Example 1.

Production of Lithium Secondary Battery

A test cell was produced according to the manner in Example 1 except that Separion S450P35 was used as a separator, methylpropylpiperidinium-FSI was used as an electrolytic solution, and LiFSI was used as an electrolyte.

Example 3

Production of Positive Electrode

A positive electrode having a coated weight of the positive electrode active substance of 5 mg/cm$^2$ was produced according to the manner in Example 1.

Production of Negative Electrode

A negative electrode having a coated weight of the negative electrode active substance of 5 mg/cm$^2$ was produced according to the manner in Example 1 except that MCMB was used as a negative electrode active substance.

Production of Lithium Secondary Battery

A test cell was produced according to the manner in Example 1 except that Separion S240P25 was used as a separator, methylpropylpiperidinium-FSI was used as an electrolytic solution, and LiFSI was used as an electrolyte.

Example 4

Production of Positive Electrode

A positive electrode having a coated weight of the positive electrode active substance of 8 mg/cm$^2$ was produced according to the manner in Example 1 except that LiMn$_2$O$_4$ was used as a positive electrode active substance.

Production of Negative Electrode

A negative electrode having a coated weight of the negative electrode active substance of 6 mg/cm$^2$ was produced according to the manner in Example 1 except that HC was used as a negative electrode active substance.

Production of Lithium Secondary Battery

A test cell was produced according to the manner in Example 1.

Example 5

Production of Positive Electrode

A positive electrode having a coated weight of the positive electrode active substance of 5 mg/cm$^2$ was produced according to the manner in Example 1 except that LiFePO$_4$ was used as a positive electrode active substance.

Production of Negative Electrode

A negative electrode having a coated weight of the negative electrode active substance of 4 mg/cm$^2$ was produced according to the manner in Example 1.

Production of Lithium Secondary Battery

A test cell was produced according to the manner in Example 1 except that LiFSI was used as an electrolyte.

Example 6

Production of Positive Electrode

A positive electrode having a coated weight of the positive electrode active substance of 6 mg/cm$^2$ was produced according to the manner in Example 1 except that LiNiO$_2$ was used as a positive electrode active substance.

Production of Negative Electrode

A negative electrode having a coated weight of the negative electrode active substance of 5 mg/cm$^2$ was produced according to the manner in Example 1 except that graphite was used as a negative electrode active substance.

Production of Lithium Secondary Battery

A test cell was produced according to the manner in Example 1 except that Separion S240P25 was used as a separator, and methylpropylpiperidinium-FSI was used as an electrolytic solution.

Example 7

Production of Positive Electrode

A positive electrode having a coated weight of the positive electrode active substance of 4 mg/cm$^2$ was produced according to the manner in Example 1.

Production of Negative Electrode

A negative electrode having a coated weight of the negative electrode active substance of 5 mg/cm$^2$ was produced according to the manner in Example 1.

Production of Lithium Secondary Battery

A test cell was produced according to the manner in Example 1 except that eThylmethylimidazolium-FSI/tetraethylammonium-FSI=9/1 was used as an electrolytic solution, and LiFSI was used as an electrolyte.

Example 8

Production of Positive Electrode

A positive electrode having a coated weight of the positive electrode active substance of 5 mg/cm$^2$ was produced according to the manner in Example 1 except that LiFePO$_4$ was used as a positive electrode active substance.

Production of Negative Electrode

A negative electrode having a coated weight of the negative electrode active substance of 5 mg/cm$^2$ was produced according to the manner in Example 1 except that HC was used as a negative electrode active substance.

Production of Lithium Secondary Battery

A test cell was produced according to the manner in Example 1 except that ethylmethylimidazolium-FSI/hexyltrimethylammonium-TFSI=8/2 was used as an electrolytic solution.

Example 9

Production of Positive Electrode

A positive electrode having a coated weight of the positive electrode active substance of 5 mg/cm$^2$ was produced according to the manner in Example 1.

Production of Negative Electrode

A negative electrode having a coated weight of the negative electrode active substance of 5 mg/cm$^2$ was produced according to the manner in Example 1 except that MCMB was used as a negative electrode active substance.

Production of Lithium Secondary Battery

A test cell was produced according to the manner in Example 1 except that LiFSI was used as an electrolyte.

Comparative Example 1

Production of Positive Electrode

A positive electrode having a coated weight of the positive electrode active substance of 4 mg/cm$^2$ was produced according to the manner in Example 1.

Production of Negative Electrode

A negative electrode having a coated weight of the negative electrode active substance of 2 mg/cm$^2$ was produced according to the manner in Example 1.

Production of Lithium Secondary Battery

A test cell was produced according to the manner in Example 1 except that Celgard was used as a separator, and LiFSI was used as an electrolyte.

Comparative Example 2

Production of Positive Electrode

A positive electrode having a coated weight of the positive electrode active substance of 5 mg/cm$^2$ was produced according to the manner in Example 1 except that LiFePO$_4$ was used as a positive electrode active substance.

Production of Negative Electrode

A negative electrode having a coated weight of the negative electrode active substance of 2 mg/cm$^2$ was produced according to the manner in Example 1 except that MCMB was used as a negative electrode active substance.

Production of Lithium Secondary Battery

A test cell was produced according to the manner in Example 1 except that Celgard was used as a separator.

Comparative Example 3

Production of Positive Electrode

A positive electrode having a coated weight of the positive electrode active substance of 7 mg/cm$^2$ was produced according to the manner in Example 1 except that LiMn$_2$O$_4$ was used as a positive electrode active substance.

Production of Negative Electrode

A negative electrode having a coated weight of the negative electrode active substance of 2 mg/cm$^2$ was produced according to the manner in Example 1.

Production of Lithium Secondary Battery

A test cell was produced according to the manner in Comparative Example 1.

Comparative Example 4

Production of Positive Electrode

A positive electrode having a coated weight of the positive electrode active substance of 5 mg/cm$^2$ was produced according to the manner in Example 1.

Production of Negative Electrode

A negative electrode having a coated weight of the negative electrode active substance of 5 mg/cm$^2$ was produced according to the manner in Example 3.

Production of Lithium Secondary Battery

A test cell was produced according to the manner in Comparative Example 1.

The lithium secondary batteries of Examples 1 to 8 and Comparative Examples 1 to 3 thus produced were subjected to a capability test and an impedance measurement at 20° C. The evaluation methods are as follows. The results are shown in Table 1.

Capability Test

A test cell was charged at 0.2 C hour rate and discharged under conditions of from 0.1 to 3 C hour rate, and the capacity retention rate of the 3 C discharge capacity with respect to the 0.1 C discharge capacity was confirmed. Furthermore, the test cell was charged and discharged under conditions of 0.5 hour rate, and the retention rate of the capacity at the 50th cycle was confirmed based on the discharge capacity of the initial cycle.

Impedance Measurement

The test cell after undergoing the initial charging and discharging was confirmed for internal resistance by using an impedance measuring apparatus to compare the values of charge migration resistance inside the cells.

TABLE 1

|  | Charging voltage (V) | Discharge capacity (mAh/g) | Retention rate $Q_{3C}/Q_{0.1C}$ (%) | Retention of capacity after at 50th cycle $Q_{1st\ cycle}/Q_{50th\ cycle}$ (%) | Charge migration resistance (mΩ) |
|---|---|---|---|---|---|
| Example 1 | 4.3 | 110 | 80 | 95 | 0.7 |
| Example 2 | 4.3 | 95 | 70 | 95 | 0.8 |
| Example 3 | 4.3 | 120 | 50 | 70 | 0.7 |
| Example 4 | 4.2 | 70 | 60 | 95 | 0.7 |
| Example 5 | 4.0 | 100 | 80 | 98 | 0.8 |
| Example 6 | 4.2 | 100 | 60 | 70 | 0.7 |
| Example 7 | 4.3 | 100 | 75 | 90 | 0.9 |
| Example 8 | 4.0 | 95 | 80 | 85 | 0.8 |
| Comparative Example 1 | 4.3 | 100 | 50 | 50 | 0.9 |

TABLE 1-continued

|  | Charging voltage (V) | Discharge capacity (mAh/g) | Retention rate $Q_{3C}/Q_{0.1C}$ (%) | Retention of capacity after at 50th cycle $Q_{1st\ cycle}/Q_{50th\ cycle}$ (%) | Charge migration resistance (mΩ) |
|---|---|---|---|---|---|
| Comparative Example 2 | 4.0 | 90 | 60 | 60 | 1.5 |
| Comparative Example 3 | 4.2 | 50 | 50 | 80 | 2.7 |

Example 9 and Comparative Example 4 were subjected to an overcharge test. The evaluation method therefor was as follows. The results are shown in Table 2.

Overcharge Test

The overcharge test (JIS 5.2.1.3) was performed at a test environmental temperature of 20° C.±5° C. The charging conditions were 3 C at constant current and constant voltage. The maximum value of the cell surface temperature upon increasing the voltage from 12 V to 20 V was confirmed to evaluate the safety.

TABLE 2

| | Positive electrode active substance | Maximum temperature of cell upon overcharge (° C.) |
|---|---|---|
| Example 9 | $LiMn_{1/3}Ni_{1/3}Co_{1/3}O_2$ | 57 |
| Comparative Example 4 | $LiMn_{1/3}Ni_{1/3}Co_{1/3}O_2$ | 75 |

The lithium secondary battery of the invention can be used for various portable devices, such as a mobile phone, a notebook computer, a personal digital assistant (PDA), a video camcorder and a digital still camera. It is also useful for a middle-sized or large-sized lithium battery mounted on an electric bicycle and an electric vehicle.

The invention claimed is:

1. A lithium secondary battery comprising a separator provided between a positive electrode and a negative electrode; a nonaqueous electrolytic solution containing a lithium salt, the nonaqueous electrolytic solution comprising a solvent including an ionic liquid that has a bis(fluorosulfonyl)imide anion as an anionic component and a cationic component selected from a methylpropylpiperidinium cation and a methylpropylpyrrolidinium cation; the separator comprising a substrate and a metallic oxide coating on the substrate, the substrate comprising polymer fibers, whereby the metallic oxide coating provides an electrically insulating porous inorganic membrane on the substrate.

2. The lithium secondary battery of claim 1 wherein the negative electrode includes a negative electrode active material selected from amorphous carbon, mesocarbon microbeads, graphite, natural graphite, a surface-modified product of a carbon material, and non-graphitizable carbon.

\* \* \* \* \*